(12) United States Patent
Ying

(10) Patent No.: US 7,733,588 B1
(45) Date of Patent: Jun. 8, 2010

(54) REPETITIVE FEED-FORWARD ALGORITHM FOR SELF-SERVO-WRITE PLL

(75) Inventor: Edward Ying, Berkeley, CA (US)

(73) Assignee: Marvell International Ltd., Hamilton (BM)

( * ) Notice: Subject to any disclaimer, the term of this patent is extended or adjusted under 35 U.S.C. 154(b) by 1059 days.

(21) Appl. No.: 11/325,277

(22) Filed: Jan. 4, 2006

(51) Int. Cl.
*G11B 5/09* (2006.01)

(52) U.S. Cl. .............. 360/39; 360/51; 360/65; 360/77.02

(58) Field of Classification Search ............ 360/24, 360/31, 49; 375/226; 714/25, 48
See application file for complete search history.

(56) References Cited

U.S. PATENT DOCUMENTS

| | | | |
|---|---|---|---|
| 4,616,276 A | | 10/1986 | Workman |
| 4,617,679 A | * | 10/1986 | Brooks ................. 375/374 |
| 4,673,982 A | * | 6/1987 | Tam et al. ............. 348/607 |
| 5,469,087 A | * | 11/1995 | Eatwell ................ 327/40 |
| 5,914,829 A | * | 6/1999 | Kadlec et al. .......... 360/78.04 |
| 6,011,899 A | * | 1/2000 | Ohishi et al. .......... 386/98 |
| 6,141,175 A | * | 10/2000 | Nazarian et al. ....... 360/77.04 |
| 6,441,692 B1 | * | 8/2002 | Nakatani et al. ....... 331/42 |
| 6,574,067 B2 | * | 6/2003 | Chen et al. ........... 360/77.04 |
| 6,646,964 B1 | * | 11/2003 | Abramovitch et al. ... 369/47.25 |
| 6,664,827 B2 | * | 12/2003 | O'Leary et al. ........ 327/156 |
| 6,738,205 B1 | * | 5/2004 | Moran et al. .......... 360/17 |
| 7,191,355 B1 | * | 3/2007 | Ouellette et al. ...... 713/400 |
| 7,199,956 B1 | * | 4/2007 | Moser et al. .......... 360/46 |
| 7,206,159 B2 | * | 4/2007 | White ................. 360/75 |
| 7,333,280 B1 | * | 2/2008 | Lifchits et al. ........ 360/51 |
| 7,372,875 B2 | * | 5/2008 | Hadzic et al. .......... 370/516 |
| 7,409,020 B1 | * | 8/2008 | Wyrzykowska et al. .. 375/350 |
| 7,424,080 B1 | * | 9/2008 | Liu .................... 375/371 |
| 7,646,557 B2 | * | 1/2010 | Brady et al. .......... 360/51 |
| 2003/0056136 A1 | * | 3/2003 | Aweya et al. .......... 713/400 |
| 2004/0090890 A1 | * | 5/2004 | Abramovitch et al. ... 369/47.28 |
| 2007/0008043 A1 | * | 1/2007 | Milicevic et al. ...... 331/57 |

OTHER PUBLICATIONS

Kok Kia Chew and Masayoshi Tomizuka; Digital Control fo Repetitive Errors in Disk Drive Systems; IEEE Control Systems Magazine; 1990; 5 pages.
Marvell; 88i6310; Integrated Hard Disk Drive Electronics; Application Notes; Doc. No. MV-S300613-00 Rev. A; Mar. 1, 2005; 186 pages.

* cited by examiner

*Primary Examiner*—Dismery E Mercedes

(57) ABSTRACT

A phase error reduction system includes a control module, a phase-locked loop (PLL) module, and a harmonic removal module. The control module generates source timestamps for a plurality of synchronization marks in a source signal using a clock and generates a plurality of target timestamps. The PLL module determines phase errors between the source timestamps and the target timestamps and minimizes the phase errors. The harmonic removal module removes harmonics of the phase errors using a weighted moving average filter (MAF). The harmonic removal module comprises a repetitive feed forward (RFF) module that includes an amplifier the scales the phase errors, a delay buffer that generates RFF commands to reduce the phase errors, and a summing module. The MAF filters the RFF commands. The summing module provides sums of the phase errors scaled by the amplifier and the RFF commands filtered by the weighted MAF to the delay buffer.

25 Claims, 12 Drawing Sheets

REPETITIVE FEED-FORWARD ALGORITHM FOR SELF-SERVO-WRITE PLL

FIELD OF THE INVENTION

The present invention relates to computer disk drives, and more particularly to systems and methods that minimize phase errors in self-servo-write phase-locked loops of disk drives.

BACKGROUND OF THE INVENTION

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

Referring now to FIG. 1, an exemplary hard disk drive (HDD) 10 is shown to include a hard disk drive (HDD) 12 and a hard drive assembly (HDA) 13. The HDA 13 includes one or more hard drive platters 14 that are collectively called a spindle. The platters 14 are coated with magnetic layers 15. The magnetic layers 15 store positive and negative magnetic fields that represent binary 1's and 0's. A spindle motor, shown schematically at 16, rotates the hard drive platters 14. Generally, the spindle motor 16 rotates the hard drive platters 14 at a fixed speed during read/write operations. One or more read/write actuator arms 18 moves relative to the hard drive platters 14 to read and/or write data to/from the hard drive platters 14.

A read/write device 20 is located near a distal end of the read/write arm 18. The read/write device 20 includes a write element such as an inductor that generates a magnetic field. The read/write device 20 also includes a read element (such as a magneto-resistive (MR) element) that senses the magnetic field on the platter 14. A preamp circuit 22 amplifies analog read/write signals.

When reading data, the preamp circuit 22 amplifies low level signals from the read element and outputs the amplified signal to a read/write channel device 24. When writing data, a write current is generated which flows through the write element of the read/write device 20. The write current is switched to produce a magnetic field having a positive or negative polarity. The positive or negative polarity is stored by the hard drive platter 14 and is used to represent data.

The HDD 12 typically includes a buffer 32 that stores data that is associated with the control of the hard disk drive and/or buffers data to allow data to be collected and transmitted as larger data blocks to improve efficiency. The buffer 32 may employ DRAM, SDRAM or other types of low latency memory. The HDD 12 further includes a processor 34 that performs processing that is related to the operation of the HDD 10.

The HDD 12 further includes a hard disk controller (HDC) 36 that communicates with a host device via an input/output (I/O) interface 38. The I/O interface 38 can be a serial or parallel interface, such as an Integrated Drive Electronics (IDE), Advanced Technology Attachment (ATA), or serial ATA (SATA) interface. The I/O interface 38 communicates with an I/O interface 44 that is associated with a host device 46.

The HDC 36 also communicates with a spindle/voice coil motor (VCM) driver 40 and/or the read/write channel device 24. The spindle/VCM driver 40 controls the spindle motor 16 that rotates the platters 14. The spindle/VCM driver 40 also generates control signals that position the read/write arm 18, for example using a voice coil actuator, a stepper motor or any other suitable actuator.

Referring now to FIG. 2, data is typically written on the platters 14 in concentric circles called tracks 50. The tracks 50 are divided radially into multiple sectors 52. As the diameter of the tracks 50 decreases toward the center of the platter 14, the sector size decreases. Before performing a read or a write operation on a sector of a track, a head locks onto the track by referring to positioning information called servo that is generally prewritten on the platters. The servo provides the positioning information so that the heads know where to write data on the platters 14 during a write operation and where to read data from during a read operation.

Traditionally, the servo is prewritten in multiple sectors using a special servo writing apparatus when a disk drive is manufactured. The traditional servo writing methods, however, become impractical as the track density, that is, the number of tracks per inch, increases for a disk drive. More recently, track density has increased as the demand for storage capacity and spin rates of disk drives is increasing. Additionally, the diameter of disk platters is shrinking so that the drives can fit into smaller devices such as palmtops and other handheld devices that require disk drives that are small in physical size and high in storage capacity.

The increasing track density also makes traditional servo writing physically impractical. Accordingly, modern disk drives increasingly use self-servo-write (SSW) methods to write their own servo sectors using the same read/write heads that are used to read/write regular data. When writing the servo using the SSW methods, the heads typically lock onto reference servo sectors (RSS) that are prewritten on the platters either concentrically or in the form of spirals.

SUMMARY OF THE INVENTION

A phase error reduction system comprises a control module that generates source timestamps for a plurality of synchronization marks in a source signal using a clock and that generates a plurality of target timestamps, a phase-locked loop (PLL) module that determines phase errors between the source timestamps and the target timestamps and that minimizes the phase errors, and a harmonic removal module that communicates with the PLL module and that removes harmonics of the phase errors.

In another feature, the harmonic removal module comprises a repetitive feed forward (RFF) module.

In another feature, the harmonic removal module selectively comprises N adaptive least-mean-square (ALMS) filter modules that remove a fundamental and N−1 harmonics of the phase errors, where N is an integer greater than 1.

In another feature, at least one of the control module, the PLL module, the RFF module, and the ALMS filter modules is implemented by a single integrated circuit.

In another feature, the RFF module comprises an amplifier that scales the phase errors, a delay buffer that generates a RFF command to reduce the phase errors, a weighted moving average filter (MAF) that filters the RFF command, and a summing module that provides sums of the phase errors scaled by the amplifier and filtered RFF commands filtered by the MAF to the delay buffer.

In another feature, the delay buffer stores a plurality of the sums and delays the RFF command by a predetermined time based on a number of the sums and an order of the MAF.

In another feature, the PLL module comprises a proportional integral controller that generates a control signal to correct the phase errors based on an output of the harmonic removal module.

In another feature, the PLL module comprises a voltage controlled oscillator that corrects phase errors based on a control signal generated by a proportional integral controller.

In another feature, the control module determines that the clock is synchronized to the source signal when the source timestamps substantially match the target timestamps within a predetermined tolerance.

In another feature, the control module selectively reduces a scaling factor of the amplifier to substantially zero when the clock is synchronized to the source signal.

In yet another feature, a phase-locked loop system comprises the phase error reduction system. In still other features, a disk drive comprises the phase-locked loop system.

In still other features, a computer program executed stored on a computer readable medium and by a processor for phase error reduction comprises generating source timestamps for a plurality of synchronization marks in a source signal using a clock, generating a plurality of target timestamps, determining phase errors between the source timestamps and the target timestamps, minimizing the phase errors, and removing harmonics of the phase errors.

In another feature, the computer program further comprises removing the harmonics using a repetitive feed forward (RFF) algorithm.

In another feature, the computer program further comprises selectively removing a fundamental and N−1 harmonics of the phase errors, where N is an integer greater than 1, using N adaptive least-mean-square (ALMS) filter modules.

In another feature, the computer program further comprises scaling the phase errors, generating a RFF command to reduce the phase errors, filtering the RFF command with a weighted moving average filter (MAF), and providing sums of scaled phase errors and filtered RFF commands to a delay buffer.

In another feature, the computer program further comprises storing a plurality of the sums in the delay buffer and delaying the RFF command by a predetermined time based on a number of the sums and an order of the MAF.

In another feature, the computer program further comprises generating a control signal to correct the phase errors based on an output of a harmonic removal algorithm.

In another feature, the computer program further comprises correcting the phase errors based on a control signal.

In another feature, the computer program further comprises determining that the clock is synchronized to the source signal when the source timestamps substantially match the target timestamps within a predetermined tolerance.

In another feature, the computer program further comprises selectively reducing a scaling factor of the amplifier to substantially zero when the clock is synchronized to the source signal.

In yet another feature, a computer program executed by a processor for implementing a phase-locked loop comprises the computer program executed by a processor for phase error reduction.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
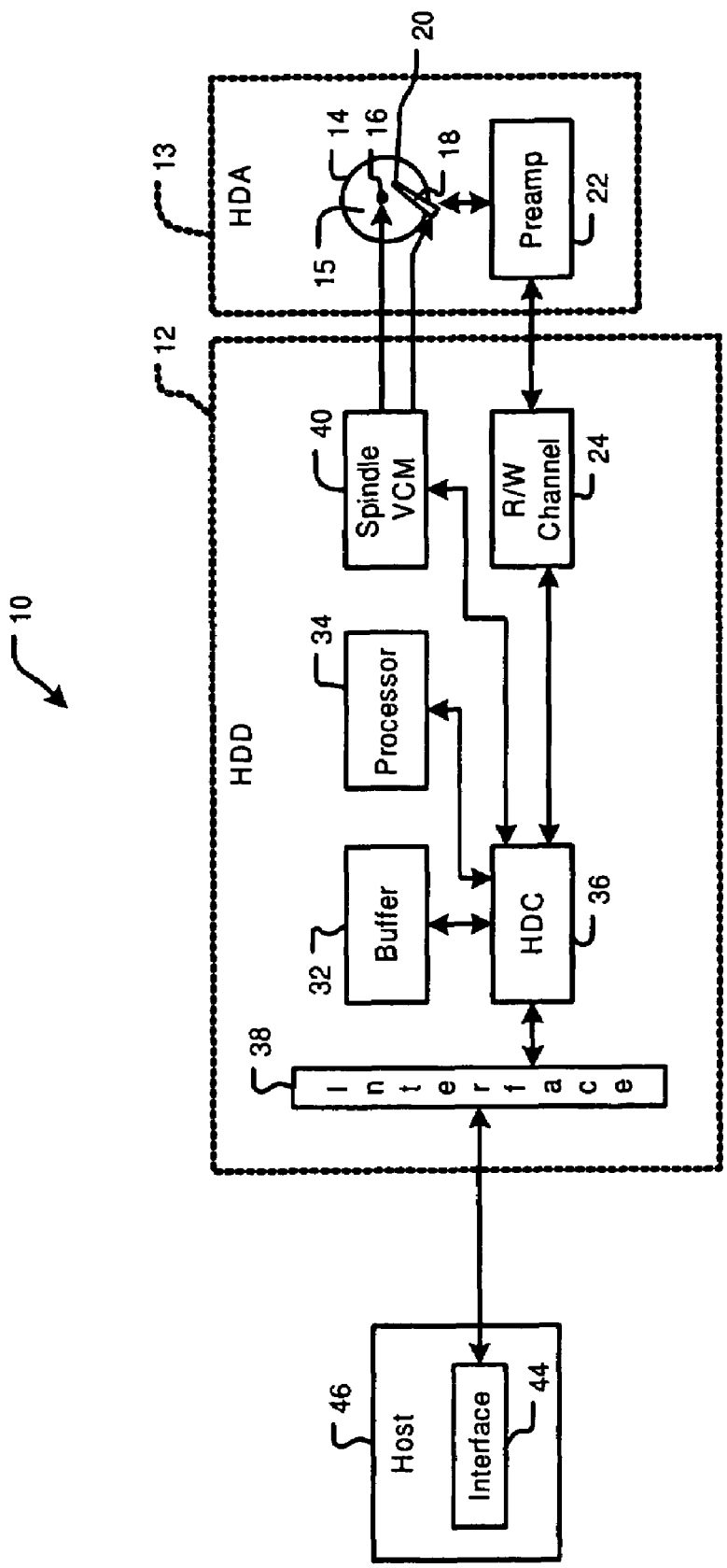
FIG. 1 is an exemplary functional block diagram of a disk drive according to the prior art.
Figure 2:
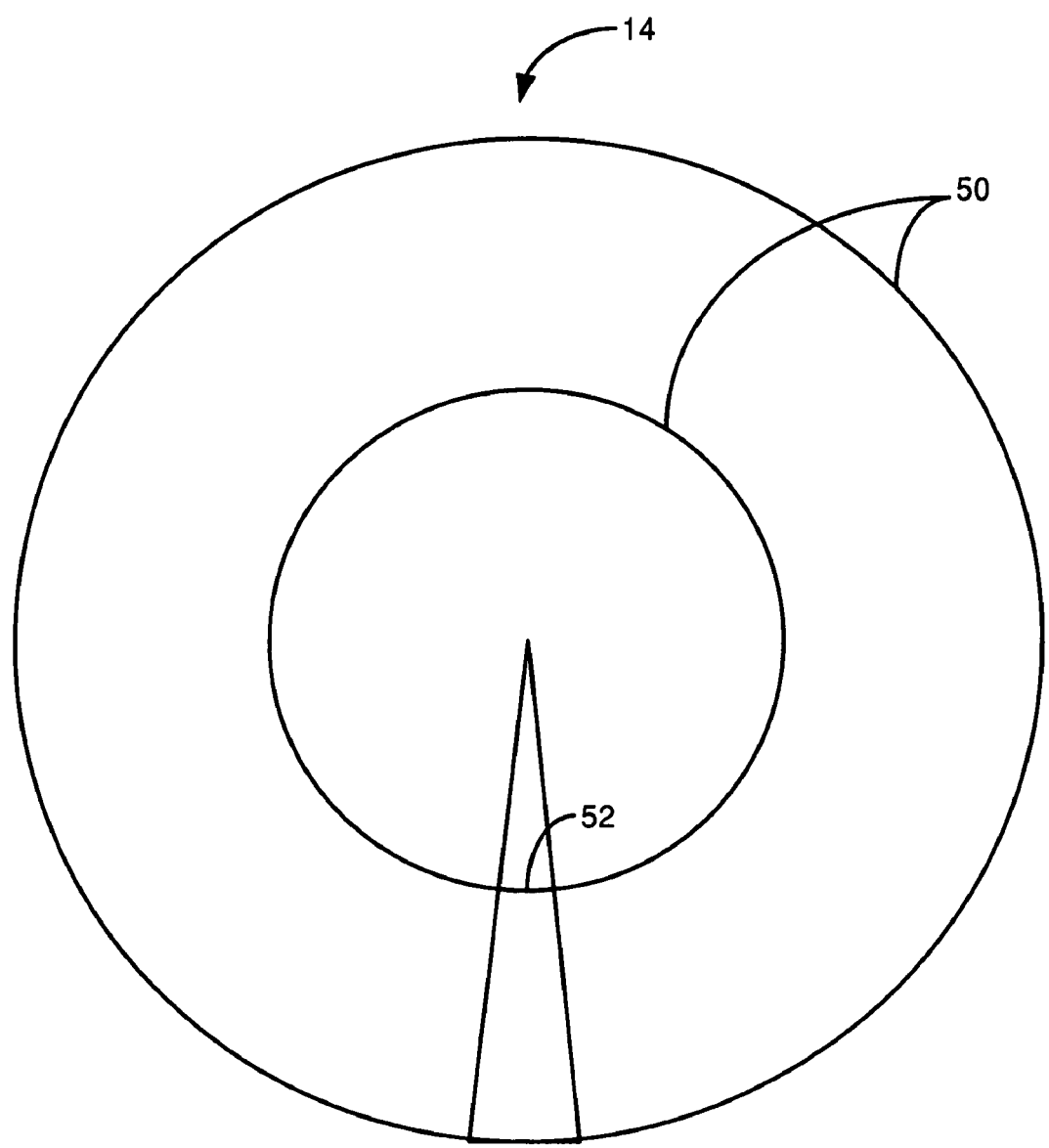
FIG. 2 is an exemplary illustration of tracks and sectors in a disk drive according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

A self-servo-write (SSW) system writes SSW sectors using an SSW clock (SSW_CLK). The SSW clock should be phase-locked to reference servo sectors (RSS) in order to correctly write the SSW sectors. Typically, a phase-locked loop (PLL) is used to synchronize the SSW clock to the RSS. A PLL utilizes a voltage controlled oscillator (VCO) to adjust the frequency and the phase of the SSW clock. Once the SSW clock is phase-locked to the RSS, the SSW sectors can be written using the SSW clock at uniform spacing between the RSS.

The SSW clock is used to measure the time between consecutive RSS sync marks. A free-running counter clocked by the SSW clock generates a SSW timestamp (STS) every time a RSS sync mark is detected. Additionally, the SSW system generates expected timestamps (ETS) based on the spindle speed and the number of RSS per revolution. A difference between the measured STS and the ETS is called a phase error (PE). The PLL minimizes the phase error. The PLL adjusts the SSW clock using the VCO such that the SSW timestamps (STS) match the expected timestamp (ETS) values, that is, the measured RSS timing equals an expected period determined by the spindle speed and the number of RSS per revolution.

Due to variations in the spindle speed and the errors that may exist in the prewritten RSS, the RSS timing may exhibit variations that are both synchronous and non-synchronous relative to the spindle rotation. These variations produce repeatable and non-repeatable phase errors (RPE and NRPE). These phase errors can be minimized by increasing the bandwidth of the PLL. Increasing the PLL bandwidth, however, increases system noise and reduces the stability and performance of the SSW system. Therefore, RPE and NRPE cannot be completely eliminated by using the PLL alone. Consequently, the SSW system cannot write the SSW sectors uniformly between the RSS.

Figure 3:
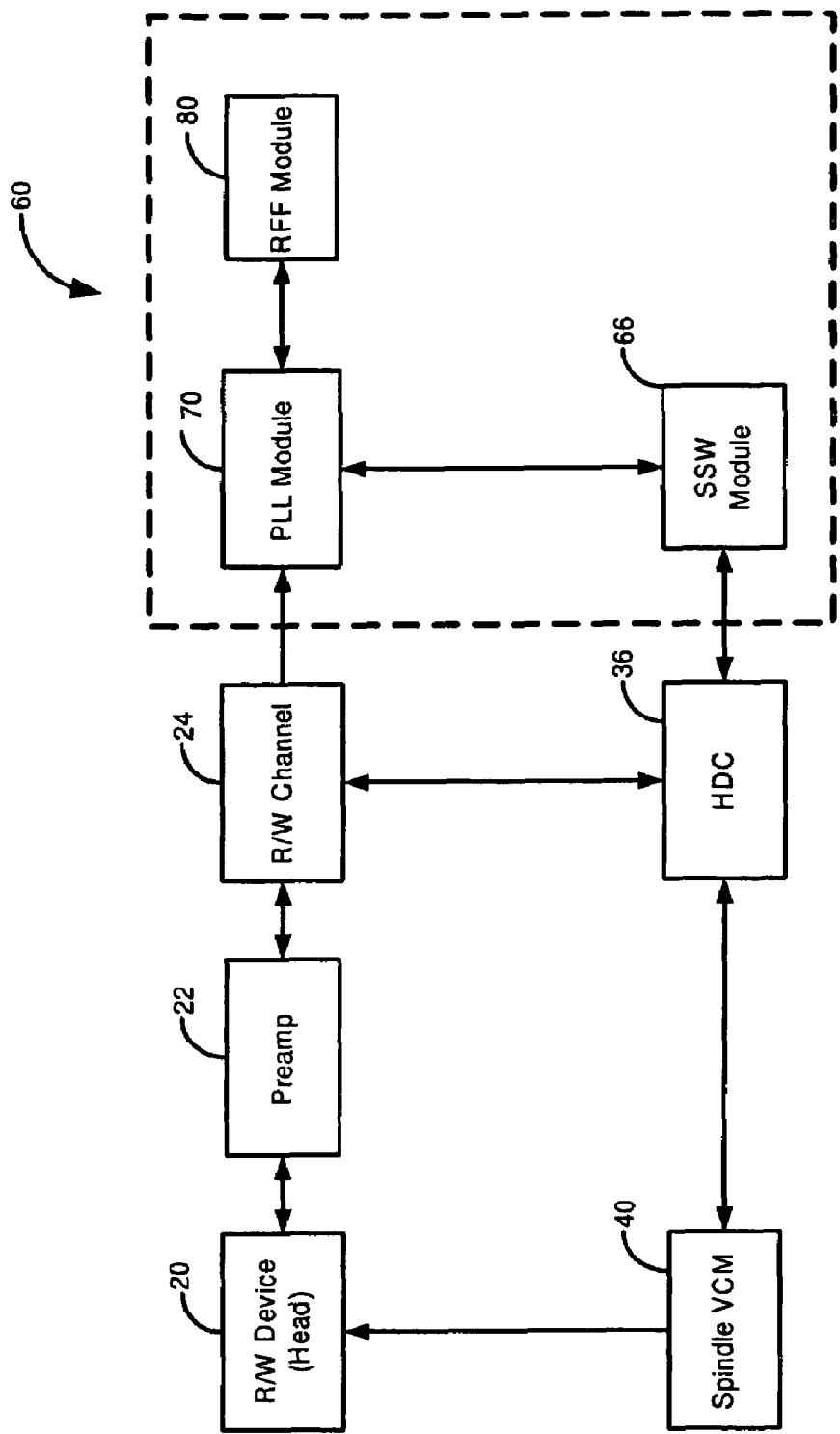
FIG. 3 is a functional block diagram of an exemplary system for minimizing phase errors in a self-servo-write (SSW) phase-locked loop (PLL) according to the present invention.

Referring now to FIG. 3, a system 60 for minimizing phase errors in a self-servo-write (SSW) phase-locked loop (PLL) using a repetitive feed-forward (RFF) algorithm is shown. A read/write head 20 reads reference servo sectors (RSS) that are typically prewritten concentrically or in the form spirals on a disk platter 14. A preamplifier module 22 amplifies the signals generated by the head 20 and outputs them to a read/write channel device 24. As the disk with prewritten spirals spins, multiple RSS sync marks are generated each time a head crosses the spirals and encounters RSS.

A self-servo-write (SSW) module 66 uses an SSW clock to write servo between the RSS. The SSW module 66 generates expected timestamps (ETS) based on the spindle speed and the number of RSS per revolution. The SSW clock is used to generate an SSW timestamp (STS) for every RSS sync mark. A PLL module 70 synchronizes the SSW clock to the RSS by minimizing phase errors between the STS and the ETS.

Some phase errors, however, remain and may have repeatable components due to variations in spindle speed and written-in errors in the RSS. A repetitive feed-forward (RFF) module 80 removes the repeatable phase errors. When the SSW clock is synchronized to the RSS, the SSW module 66 utilizes a hard disk controller (HDC) module 36 and a spindleNCM driver 40 to write servo between the RSS with the synchronized SSW clock.

Generally, a PLL 70 is implemented by hardware. If, however, a system on chip (SOC) architecture is used to implement a PLL, then the PLL may be implemented entirely by firmware and is referred to as FPLL (Firmware Phase-Locked Loop). Similarly, the RFF module 80 may be implemented by hardware and/or firmware. Moreover, the PLL module 70 and the RFF module 80 may be implemented by a single module or alternatively in the SSW module 66.

Figure 4:
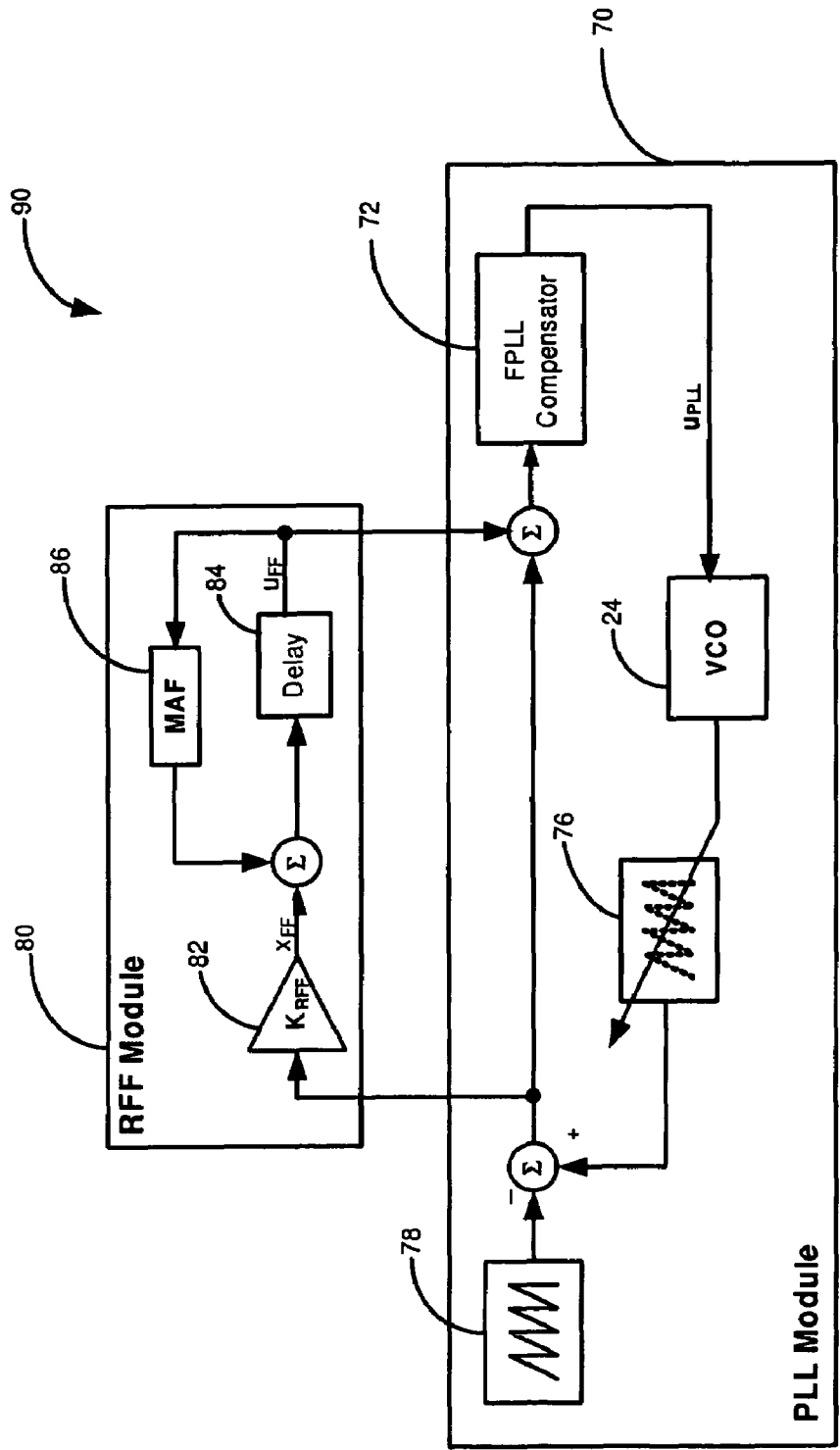
FIG. 4 is a functional block diagram of an exemplary system for augmenting a phase-locked loop (PLL) with a repetitive feed-forward (RFF) algorithm according to the present invention.

Referring now to FIG. 4, a system 90 for augmenting a PLL 70 with an RFF algorithm is shown. The PLL module 70 comprises a PLL compensator 72 (or an FPLL compensator if SOC is used) and a voltage controlled oscillator (VCO) 74. The PLL module 70 compares SSW timestamps 76 (STS) of RSS sync marks generated using SSW clock to expected timestamps 78 (ETS) generated by firmware. A phase error between the STS 76 and ETS 78 is fed to the RFF module 80.

The RFF module 80 comprises an amplifier 82, a delay buffer 84, and a weighted moving average filter (MAF) 86. The amplifier 82 scales the phase error. The delay buffer 84 applies a time delay approximately equal to one spindle revolution relative to its input. The delay buffer 84 and the MAF 86 form a positive feedback loop that functions as a periodic signal generator. The RFF module 80 removes the harmonic components of repeatable phase errors (RPE) with little or no increase in non-repeatable phase errors (NRPE).

The amplifier 82 has a fractional feed-forward gain of $K_{RFF}$ that may be typically less than 1 for system stability. The amplifier 82 scales the phase error between STS 76 and ETS 78. The scaled phase error is summed with a filtered RFF command and the result, $x_{FF}$, is fed to a delay buffer 84. The delay buffer 84 has a length equal to the number of RSS sync marks per spindle revolution. The delay buffer 84 comprises $x_{FF}$ values that are updated upon detection of every RSS sync mark.

The output of the delay buffer 84 is an RFF command $u_{FF}$. The REF command is fed to the weighted MAF 86. The MAF 86 can be represented by the following equation:

$$MAF(z) = w_0 + w_1 z^{-1} + w_2 z^{-2} + \ldots + w_n z^{-n},$$

where z is the unit delay operator, n is the filter order (typically an even number), and the filter coefficients $w_i$ are constrained by $$\sum_{i=0}^{n} w_i = 1.$$

The MAF 86 functions like a low-pass filter and increases system stability by reducing the sensitivity of the RFF algorithm to system noise.

The output of the MAF 86, a filtered RFF command, is looped back and combined with the scaled phase error, and the combination is fed back to the delay buffer 84. The delay buffer 84 delays the combination of the scaled phase error and the filtered RFF command by a number of samples equal to the number of RSS in one spindle revolution minus an offset determined by the order of the MAF 86. The delay buffer 84 generates the RFF command for the PLL module 70.

A PLL compensator 72 (or an FPLL compensator if SOC is used to implement the PLL 70) typically functions as a proportional integral (PI) controller. The PLL compensator 72 generates a control signal, $u_{PLL}$, based on the phase error in combination with the RFF command. The control signal $u_{PLL}$ is fed to the VCO 74 that adjusts the SSW clock frequency and phase so that the SSW clock matches the RSS.

During each revolution, the delay buffer 84 is updated with $x_{FF}$. The PLL module 70 compares STS 76 the ETS 78. The phase error between STS 76 and ETS 78 is fed to the RFF module 80. The PLL compensator 72 generates a control signal based on the RFF command, and the VCO 74 synchronizes the SSW clock to the RSS.

Typically, within a few revolutions, the SSW module 66 detects that the sync mark to sync mark distance count approaches a constant value, that is, the measured timestamps 76 match the expected timestamps 78. At that point, the SSW clock is substantially synchronized to the RSS. The SSW module 66 writes servo between the RSS using the SSW clock that is synchronized to the RSS.

Figure 5:
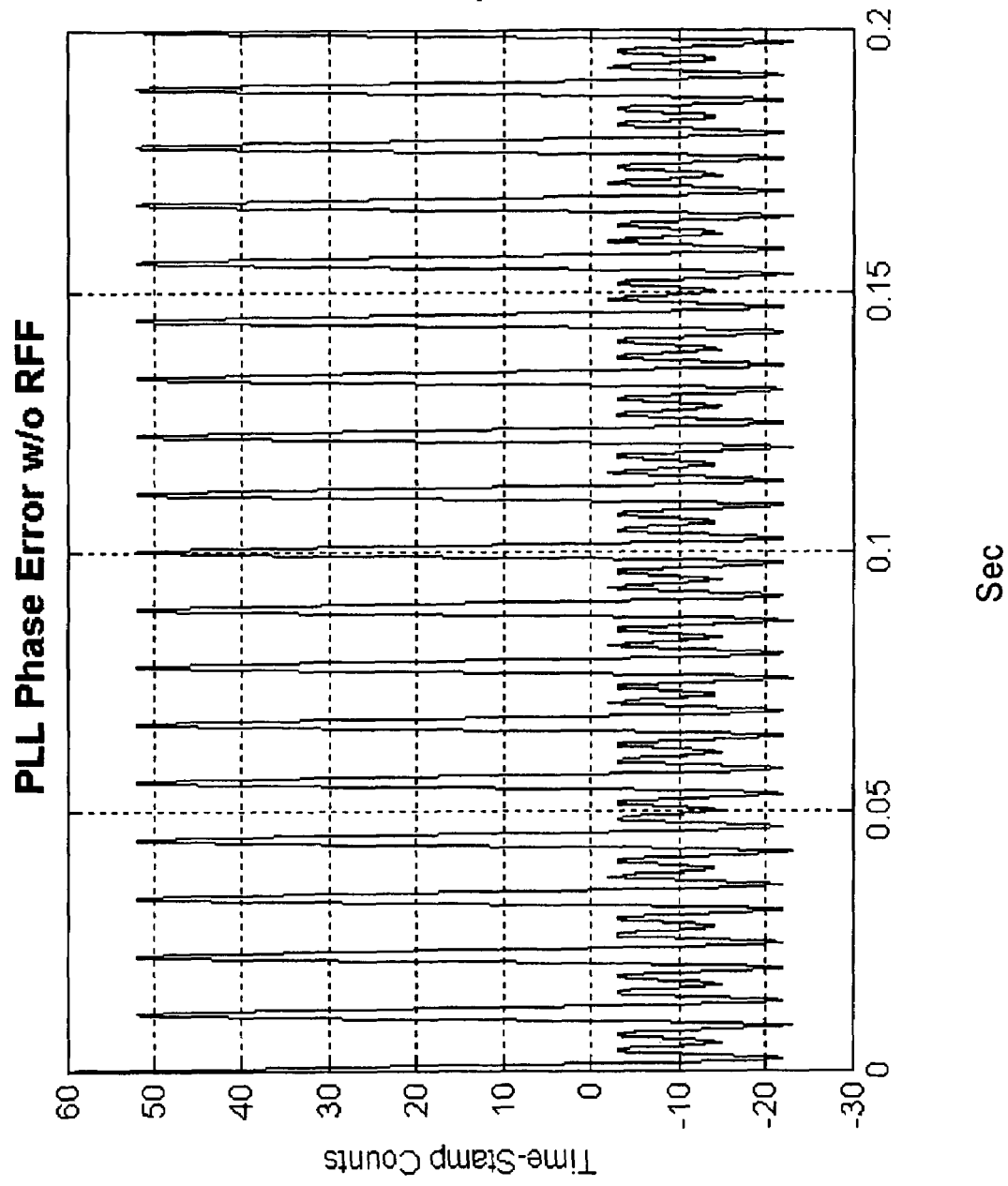
FIG. 5 is a graph of exemplary waveforms illustrating presence of harmonics in PLL phase error when not using RFF according to the present invention.
Figure 6:
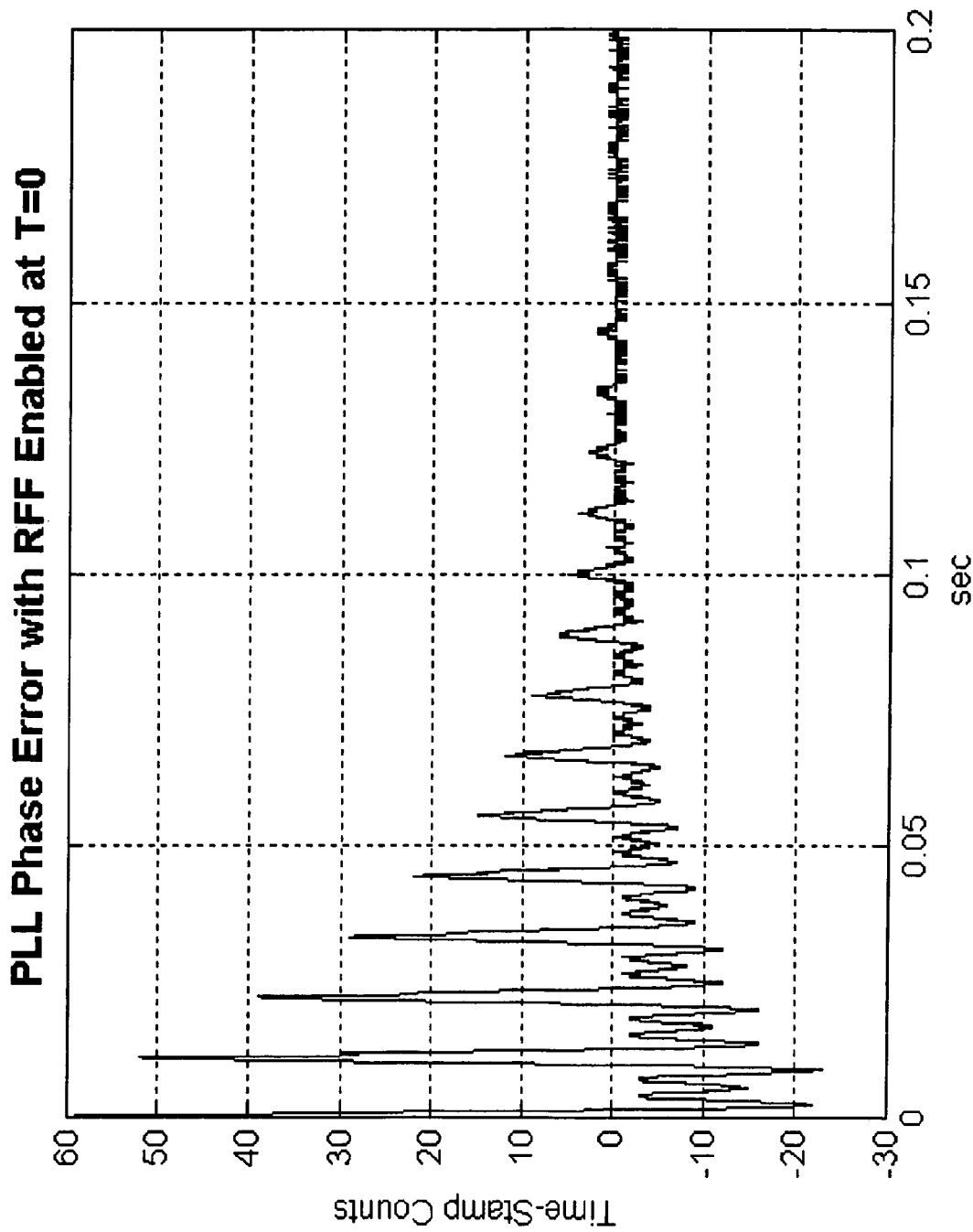
FIG. 6 is a graph of exemplary waveforms illustrating elimination of harmonics from PLL phase error by using RFF algorithm according to the present invention.

FIG. 5 illustrates the presence of harmonics of the RPE in a PLL when an RFF algorithm is not used. FIG. 6 illustrates the elimination of the harmonics of the RPE by using the RFF algorithm.

Figure 7:
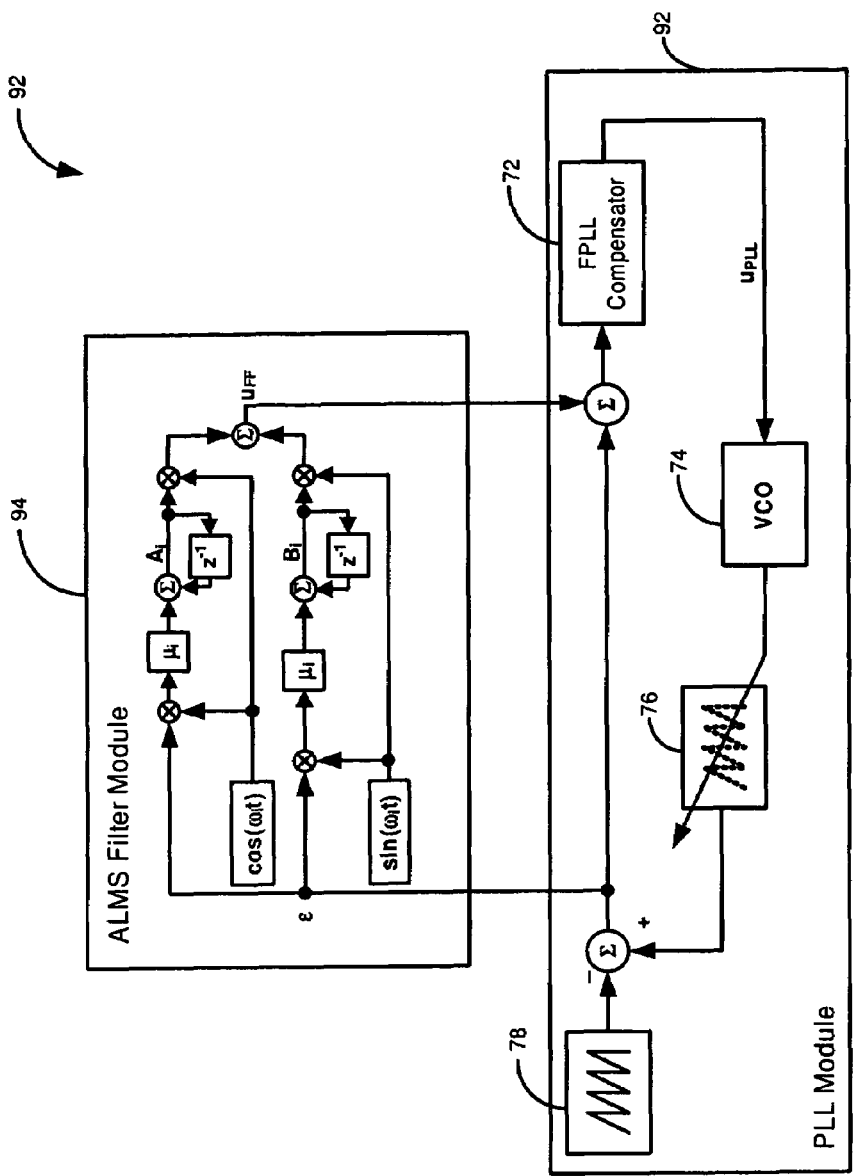
FIG. 7 is a functional block diagram of an exemplary system for augmenting a phase-locked loop (PLL) with an adaptive least-mean-square (ALMS) algorithm according to the present invention.

Referring now to FIG. 7, an alternate system 92 for minimizing phase errors in a PLL by using an adaptive least-mean-square (ALMS) filter 94 is shown. Unlike the system 90 that uses the RFF algorithm, the system 92 does not remove all the harmonics from the RPE. Instead, the system 92 removes a specified number of harmonics.

The system 92 estimates the Fourier coefficients of the specified number of RPE harmonics and generates a feed-forward command by using an ALMS algorithm that is represented by the following equation:

$$u_{FF}(k) = \sum_{i=1}^{M} (A_i(k) \cdot \cos(\omega_i Tk) + B_i(k) \cdot \sin(\omega_i Tk))$$

$$A_i(k+1) = A_i(k) + \mu_i \cdot \varepsilon(k) \cdot \cos(\omega_i Tk)$$

$$B_i(k+1) = B_i(k) + \mu_i \cdot \varepsilon(k) \cdot \sin(\omega_i Tk)$$

where, i=harmonic number, M=total number of harmonics to remove, T=FPLL sampling period, k=FPLL sample number, $\varepsilon$=PLL phase error, o=harmonic radial frequency, and $\mu$=LMS filter gain <1.

The system 92 is computation-intensive. Removing the fundamental and N harmonics from the RPE requires (N+1) ALMS filters 94 cascaded or arranged in parallel. Therefore, the execution time of the system 92 employing the ALMS algorithm may be slower than the execution time of system 90 employing the RFF algorithm as the number of harmonics to be removed using the ALMS algorithm increases.

Figure 8:
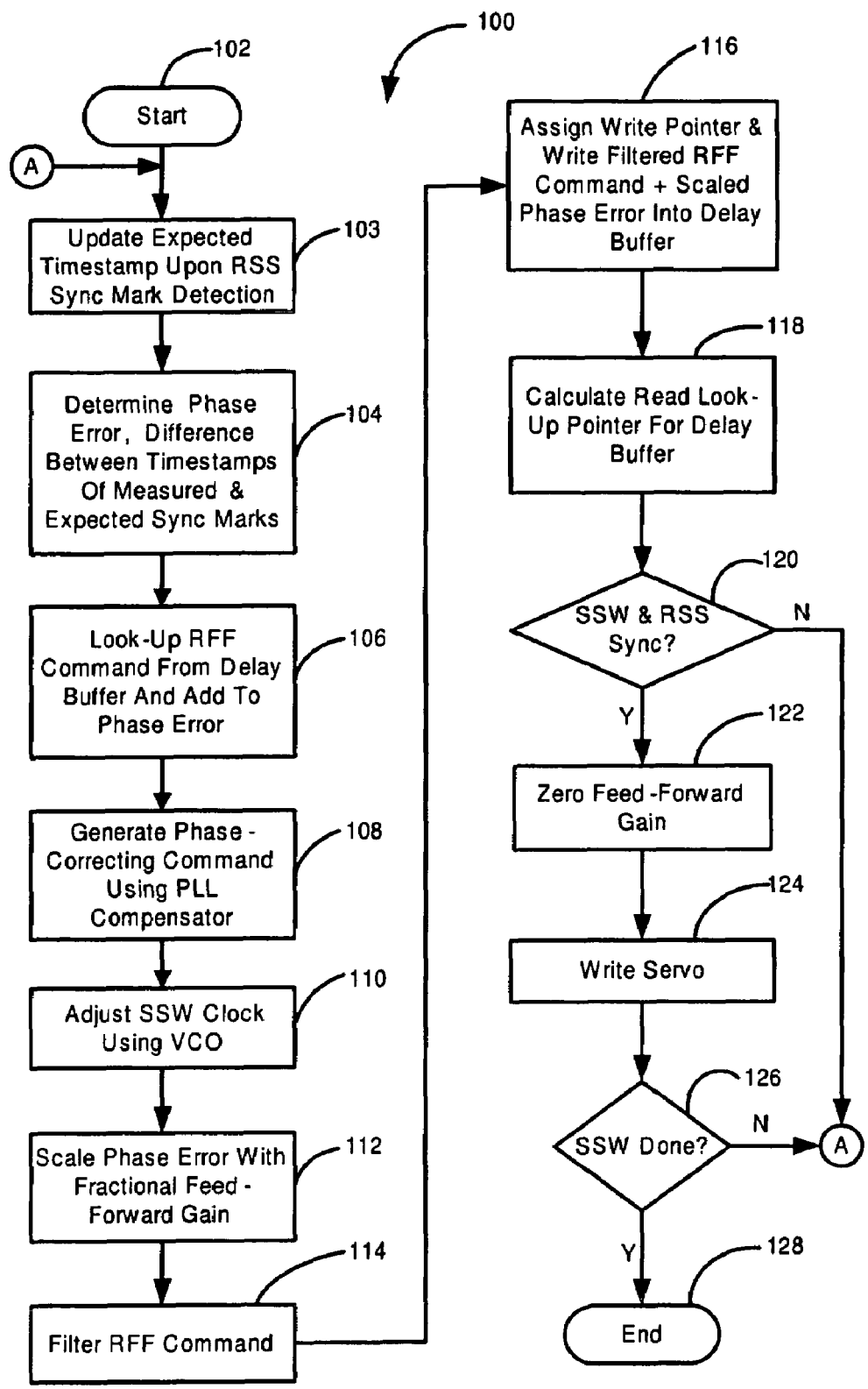
FIG. 8 is a flowchart illustrating an exemplary method for implementing an RFF algorithm according to the present invention.

Referring now to FIG. 8, a method 100 for implementing a repetitive feed-forward (RFF) algorithm begins at step 102. When an RSS sync mark is detected in a sample k, a firmware-generated expected timestamp (ETS) is updated in step 103 as follows:

ETS$_k$=ETS$_{k-1}$+ExpectedSector2SectorTime, where ExpectedSector2SectorCounts=F$_{STS}$×60÷SpindleRPM÷N, where N=Number of RSS per revolution, and F$_{STS}$=Frequency of SSW timestamp counter (F$_{STS}$∝SSW_CLK).

In step 104, a phase difference between STS 76 and ETS 78 is determined. This is the phase error or PE between the RSS and the SSW clock. The phase error is calculated as follows:

PE$_k$=STS$_k$−ETS$_k$, where STS$_k$ is a measured SSW timestamp and ETS$_k$ is the expected timestamp.

In step 106, a repetitive feed-forward (RFF) command u$_{FF}$ is retrieved from the delay buffer 84 by using a buffer read pointer and is added to the phase error as follows:

UFF$_k$=DB(bufferReadPointer)

PE$_k$=PE$_k$+UFF$_k$ where UFF$_k$ is calculated (N−d) samples before current sample k. That is, UFF$_k$=XFF$_{k-N+d}$, where XFF$_k$=DB(bufferWritePointer), and d=2 is a delay offset.

In step 108, a PLL compensator 72 (or an FPLL compensator if a PLL 70 is implemented by firmware) processes a combination of the phase error and the repetitive feed-forward command u$_{FF}$. The PLL compensator 72 generates a phase-correcting command u$_{PLL}$ that removes repetitive harmonics from the phase error. The phase-correcting command u$_{PLL}$ can be expressed by the following formula:

$$UPLL_k = pGainPLL \cdot PE_k + iGainPLL \cdot \sum_{i=0}^{k} PE_i$$

where pGainPLL is a PLL proportional gain, iGainPLL is a PLL integral gain, and $$\sum_{i=0}^{k} PE_i$$

is the running sum of phase error data from initial to current sample k.

In step 110, a VCO 74 adjusts the SSW clock to the RSS according to the phase correcting command u$_{PLL}$ generated by the PLL compensator 72. Specifically, the phase correcting command u$_{PLL}$ is written into the VCO 74 to adjust the SSW clock, and the sample is incremented, i.e., k=k+1.

In step 112, an amplifier 82 with a fractional gain of K$_{RFF}$ scales the phase error PE$_{k-1}$ from previous sample, where the phase error PE$_{k-1}$ is determined as shown in step 104. This is mathematically expressed as follows:

ScaledPE$_k$=K$_{RFF}$·PE$_{k-1}$

In step 114, a weighted moving average filter (MAF) 86 filters the RFF command UFF$_{k-1}$ from the previous sample. For a 2$^{nd}$ order MAF, this is mathematically expressed as follows:

FilteredRFF$_k$=q·UFF$_{k-1}$+(1−2·q)·UFF$_{k-2}$+q·UFF$_{k-3}$ where the filter weighting coefficient q, typically has a value $\leq$¼, although other suitable values may be employed.

In step 116, the filtered RFF command FilteredRFF$_k$ and the scaled phase error ScaledPE$_k$ are combined and written to the delay buffer 84 using a buffer write pointer corresponding to an RSS index. This is mathematically expressed as follows:

bufferWritePointer=RSS_Number(increments between 0 and N−1)

XFF$_k$=ScaledPE$_k$+FilteredRFF$_k$

DB(bufferWritePointer)=XFF$_k$

In step 118, the buffer read pointer used in step 106 is calculated from the bufferWritePointer as follows:

bufferReadPointer=(bufferWritePointer−N+d) MODULO N where N=number of RSS per revolution, and d=2 is the delay offset. This buffer read pointer provides a delay between the value of XFF$_k$ written to the delay buffer 84 in step 116 and the RFF command UFF$_k$ added to the phase error in step 106. The delay is approximately equal to one spindle revolution period.

expected timestamps 78, that is, when the sync mark to sync mark distance count approaches a constant value. If the SSW clock is still not synchronized to the RSS, the steps 103 through 120 are repeated. If the SSW clock is synchronized to the RSS, the scaling factor $K_{RFF}$ can be set to zero in step 122 so that only the filtered RFF command is fed to the delay buffer 84. This causes the RFF module 80 to produce a fixed RFF command sequence.

In step 124, the SSW module 66 utilizes a hard disk controller (HDC) module 36 and a spindle/VCM driver 40 and writes the servo using the SSW clock that is synchronized to the RSS. In step 126, the SSW module 66 determines whether servo writing is completed. The steps 103 through 126 are repeated if the servo writing is incomplete. The method 100 ends in step 128 if the servo writing is completed.

Figure 9B:
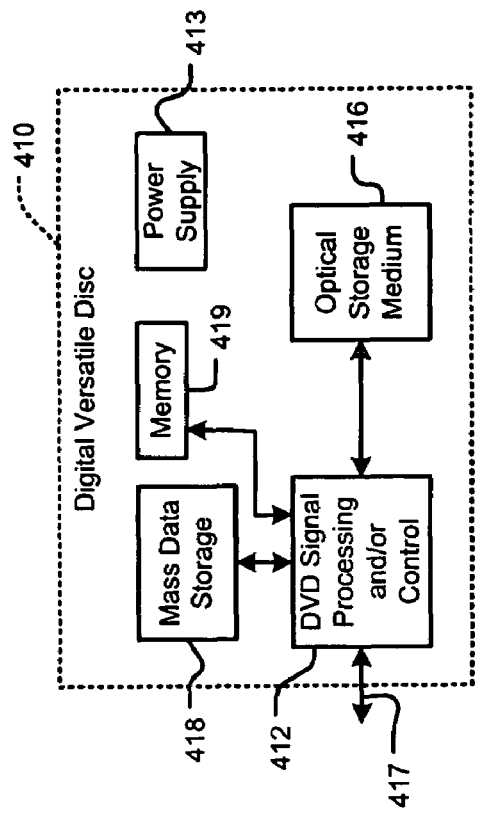
FIG. 9B is a functional block diagram of a digital versatile disk (DVD)
Figure 9A:
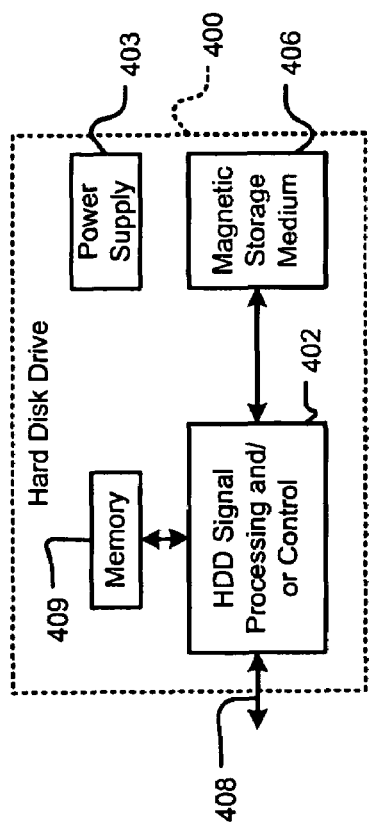
FIG. 9A is a functional block diagram of a hard disk drive.

Referring now to FIGS. 9A-9G, various exemplary implementations of the present invention are shown. Referring now to FIG. 9A, the present invention can be implemented in a hard disk drive 400. The present invention may be implemented in either or both signal processing and/or control circuits that are generally identified in FIG. 9A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 9B, the present invention can be implemented in a digital versatile disc (DVD) drive 410. The present invention may be implemented in either or both signal processing and/or control circuits that are generally identified in FIG. 9B at 412, and mass data storage 418 of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 9A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 9D:
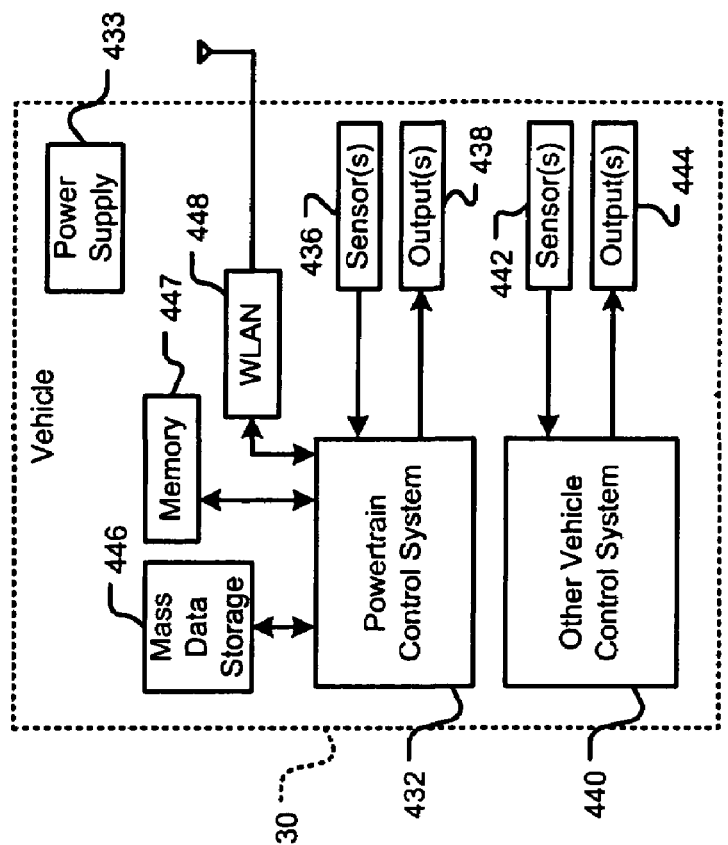
FIG. 9D is a functional block diagram of a vehicle control system.
Figure 9C:
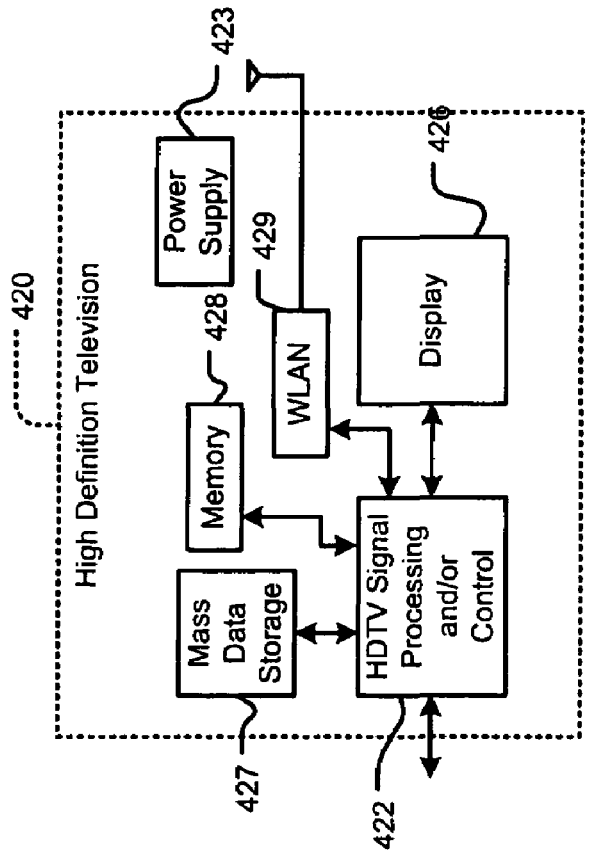
FIG. 9C is a functional block diagram of a high definition television.

Referring now to FIG. 9C, the present invention can be implemented in a high definition television (HDTV) 420. The present invention may be implemented in either or both signal processing and/or control circuits that are generally identified in FIG. 9C at 422, and mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 9D, the present invention may be implemented in mass data storage 446 of a vehicle control system 430. In some implementations, the present invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 9E:
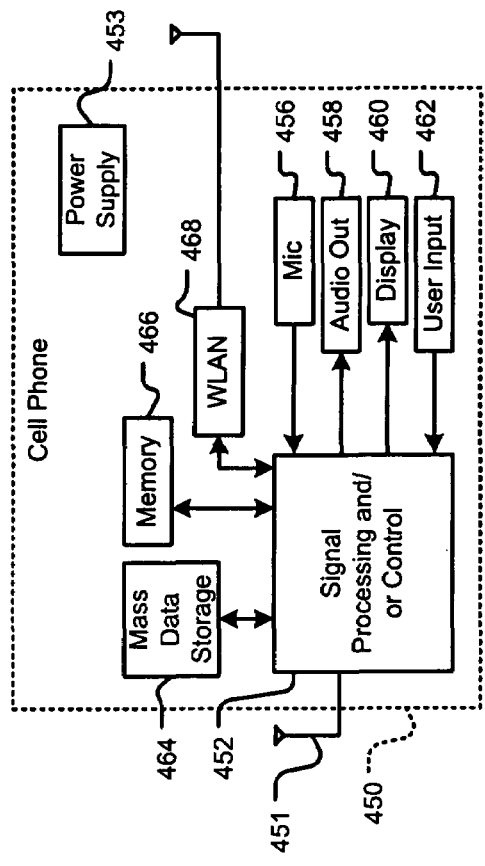
FIG. 9E is a functional block diagram of a cellular phone.

Referring now to FIG. 9E, the present invention can be implemented in a cellular phone 450 that may include a cellular antenna 451.

The present invention may be implemented in either or both signal processing and/or control circuits that are generally identified in FIG. 9E at 452, and mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 9F:
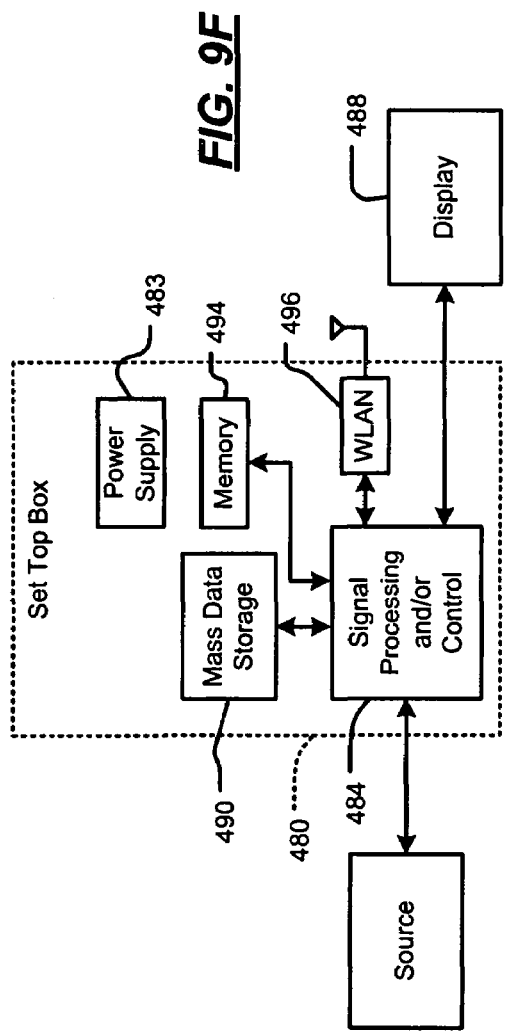
FIG. 9F is a functional block diagram of a set top box.

Referring now to FIG. 9F, the present invention can be implemented in a set top box 480. The present invention may be implemented in either or both signal processing and/or control circuits that are generally identified in FIG. 9F at 482, and mass data storage 490 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 9G:
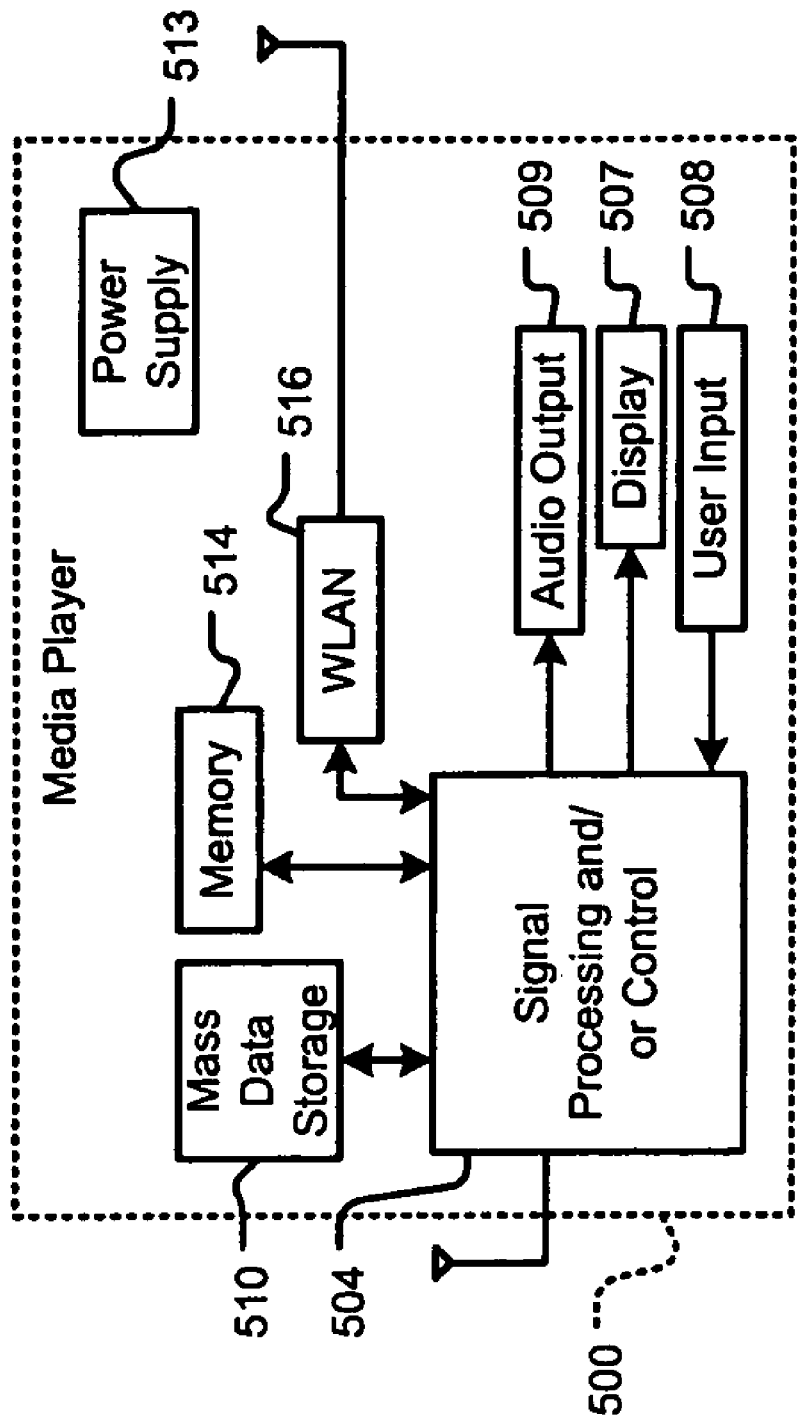
FIG. 9G is a functional block diagram of a media player.

Referring now to FIG. 9G, the present invention can be implemented in a media player 500. The present invention may be implemented in either or both signal processing and/or control circuits that are generally identified in FIG. 9G at 504, and mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A phase error reduction system, comprising:
   a control module that generates source timestamps for a plurality of synchronization marks in a source signal using a clock and that generates a plurality of target timestamps;
   a phase-locked loop (PLL) module that determines phase errors between said source timestamps and said target timestamps and that minimizes said phase errors; and
   a harmonic removal module that communicates with said PLL module and that removes harmonics of said phase errors using a weighted moving average filter (MAF),
   wherein said harmonic removal module further comprises a repetitive feed forward (RFF) module that includes:
   an amplifier that scales said phase errors;
   a delay buffer that generates RFF commands to reduce said phase errors;
   said weighted moving average filter (MAF) that filters said RFF commands; and
   a summing module that provides sums of said phase errors scaled by said amplifier and said RFF commands filtered by said weighted MAF to said delay buffer.

2. The phase error reduction system of claim 1, wherein at least one of said control module, said PLL module, and said harmonic removal module is implemented by a single integrated circuit.

3. The phase error reduction system of claim 1, wherein said delay buffer stores said sums and delays said RFF commands by a predetermined time based on a number of said sums and an order of said weighted MAF.

4. The phase error reduction system of claim 1, wherein said PLL module comprises a proportional integral controller that generates a control signal to correct said phase errors based on an output of said harmonic removal module.

5. The phase error reduction system of claim 1, wherein said PLL module comprises a voltage controlled oscillator that corrects phase errors based on a control signal generated by a proportional integral controller.

6. The phase error reduction system of claim 1, wherein said control module determines that said clock is synchronized to said source signal when said source timestamps substantially match said target timestamps within a predetermined tolerance.

7. The phase error reduction system of claim 1, wherein said control module selectively reduces a scaling factor of said amplifier to approximately zero when said clock is synchronized to said source signal.

8. A phase-locked loop system comprising said phase error reduction system of claim 1.

9. A disk drive comprising said phase-locked loop system of claim 8.

10. A phase error reduction method, comprising:
   generating source timestamps for a plurality of synchronization marks in a source signal using a clock;
   generating a plurality of target timestamps;
   determining phase errors between said source timestamps and said target timestamps;
   minimizing said phase errors; and
   removing harmonics of said phase errors using a weighted moving average filter (MAF),
   wherein removing said harmonics further comprises using a repetitive feed forward (RFF) algorithm implemented by:
   scaling said phase errors;
   generating RFF commands to reduce said phase errors;
   filtering said RFF commands with said weighted moving average filter (MAF); and
   providing sums of scaled phase errors and filtered RFF commands to a delay buffer.

11. The phase error reduction method of claim 10 further comprising storing said sums in said delay buffer and delaying said RFF commands by a predetermined time based on a number of said sums and an order of said MAF.

12. The phase error reduction method of claim 10 further comprising generating a control signal to correct said phase errors based on an output of a harmonic removal algorithm.

13. The phase error reduction method of claim 10 further comprising correcting said phase errors based on a control signal.

14. The phase error reduction method of claim 10 further comprising determining that said clock is synchronized to said source signal when said source timestamps substantially match said target timestamps within a predetermined tolerance.

15. The phase error reduction method of claim 10 further comprising selectively reducing a scaling factor of said amplifier to approximately zero when said clock is synchronized to said source signal.

16. The phase error reduction method of claim 10 further comprising implementing said phase error reduction method in a phase-locked loop.

17. A phase error reduction system, comprising:
   control means for generating source timestamps for a plurality of synchronization marks in a source signal using a clock and generating a plurality of target timestamps;
   phase-locked loop (PLL) means for determining phase errors between said source timestamps and said target timestamps and for minimizing said phase errors; and
   harmonic removal means that communicates with said PLL means for removing harmonics of said phase errors using weighted moving average filter (MAF) means for filtering said harmonics,
   wherein said harmonic removal means further comprises repetitive feed forward (RFF) means for removing said harmonics, and wherein said RFF means includes:
   amplifier means for scaling said phase errors;
   delay buffer means for generating RFF commands to reduce said phase errors;
   said weighted moving average filter (MAF) means for filtering said RFF commands; and
   summing means for providing sums of said phase errors scaled by said amplifier means and said RFF commands filtered by said weighted MAF means to said delay buffer means.

18. The phase error reduction system of claim 17, wherein at least one of said control means, said PLL means, said harmonic removal means is implemented by a single integrated circuit.

19. The phase error reduction system of claim 17, wherein said delay buffer means stores said sums and delays said RFF commands by a predetermined time based on a number of said sums and an order of said weighted MAF means.

20. The phase error reduction system of claim 17, wherein said PLL means comprises proportional integral controller means for generating a control signal to correct said phase errors based on an output of said harmonic removal means.

21. The phase error reduction system of claim 17, wherein said PLL means comprises voltage controlled oscillator means for correcting phase errors based on a control signal generated by a proportional integral controller means.

22. The phase error reduction system of claim 17, wherein said control means determines that said clock is synchronized to said source signal when said source timestamps substantially match said target timestamps within a predetermined tolerance.

23. The phase error reduction system of claim 17, wherein said control means selectively reduces a scaling factor of said amplifier means to approximately zero when said clock is synchronized to said source signal.

24. A phase-locked loop system comprising said phase error reduction system of claim 17.

25. A disk drive comprising said phase-locked loop system of claim 24.

* * * * *